(12) United States Patent
Detering et al.

(10) Patent No.: US 8,889,033 B2
(45) Date of Patent: Nov. 18, 2014

(54) LOW MOLECULAR WEIGHT PHOSPHORUS-CONTAINING POLYACRYLIC ACIDS AND USE THEREOF AS SCALE INHIBITORS IN WATER-CARRYING SYSTEMS

(75) Inventors: Jürgen Detering, Limburgerhof (DE); Bolette Urtel, Bobenheim-Roxheim (DE); Stephan Nied, Neustadt / Wstr. (DE); Ewald Heintz, Schweigen-Rechtenbach (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/363,576

(22) Filed: Feb. 1, 2012

(65) Prior Publication Data
US 2012/0199783 A1    Aug. 9, 2012

Related U.S. Application Data

(60) Provisional application No. 61/439,380, filed on Feb. 4, 2011.

(51) Int. Cl.
*C02F 5/10* (2006.01)
*C02F 103/02* (2006.01)
*C02F 103/08* (2006.01)

(52) U.S. Cl.
CPC ............ *C02F 5/10* (2013.01); *C02F 2103/023* (2013.01); *C02F 2103/08* (2013.01)
USPC ........... 252/180; 252/175; 526/233; 526/212; 510/230

(58) Field of Classification Search
USPC ........... 252/180, 175; 526/233, 212; 510/230, 510/233, 212
See application file for complete search history.

(56) References Cited

U.S. PATENT DOCUMENTS

| 5,077,361 | A | * | 12/1991 | Hughes et al. | 526/233 |
| 5,216,099 | A | * | 6/1993 | Hughes et al. | 526/318.2 |
| 5,256,746 | A | * | 10/1993 | Blankenship et al. | 526/233 |
| 5,294,687 | A | * | 3/1994 | Blankenship et al. | 526/233 |
| 5,415,783 | A | * | 5/1995 | Johnson et al. | 210/699 |
| 5,681,479 | A |   | 10/1997 | Kerr et al. | |
| 6,395,813 | B1 |  | 5/2002 | Duccini et al. | |
| 2006/0191851 | A1 | * | 8/2006 | Mizuno et al. | 210/699 |
| 2010/0105832 | A1 |  | 4/2010 | Csihony et al. | |
| 2011/0054071 | A1 |  | 3/2011 | Mattmann et al. | |

FOREIGN PATENT DOCUMENTS

| EP | 1 074 293 A1 | 2/2001 |
| EP | 2 182 011 A1 | 5/2010 |
| WO | WO 2009/133186 A1 | 11/2009 |
| WO | WO 2011/054789 A1 | 5/2011 |

OTHER PUBLICATIONS

U.S. Appl. No. 13/545,534, filed Jul. 10, 2012, Detering, et al.
U.S. Appl. No. 13/569,538, filed Aug. 8, 2012, Detering, et al.

* cited by examiner

*Primary Examiner* — Nicole M Buie-Hatcher
*Assistant Examiner* — M. Reza Asdjodi
(74) *Attorney, Agent, or Firm* — Oblon, Spivak, McClelland, Maier & Neustadt, L.L.P.

(57) ABSTRACT

The invention relates to an aqueous solution of acrylic acid polymers, obtainable by polymerization of acrylic acid in feed mode with peroxodisulfate as initiator in the presence of hypophosphite in water as solvent, wherein
(i) water and optionally one or more ethylenically unsaturated comonomers are initially charged, and
(ii) acrylic acid in acidic, unneutralized form, optionally one or more ethylenically unsaturated comonomers, aqueous peroxodisulfate solution and aqueous hypophosphite solution are added continuously, and
(iii) a base is added on completion of the acrylic acid feed to the aqueous solution, wherein the comonomer content does not exceed 30% by weight, based on total monomer content.

9 Claims, No Drawings

LOW MOLECULAR WEIGHT PHOSPHORUS-CONTAINING POLYACRYLIC ACIDS AND USE THEREOF AS SCALE INHIBITORS IN WATER-CARRYING SYSTEMS

This invention relates to low molecular weight phosphorus-containing polyacrylic acids, aqueous solutions comprising same, processes for production thereof and also use thereof as scale inhibitors in water-carrying systems.

The solubility of most substances in water is limited. The prevention of mineral deposits in water-carrying systems is important in industrial water treatment in particular. Inorganic substances and salts such as, for example, calcium carbonate, magnesium carbonate, magnesium hydroxide, calcium sulfate, barium sulfate and calcium phosphate have low solubility in water. When these dissolved ingredients become concentrated in aqueous systems, their solubility product is exceeded, which causes these substances to precipitate and form deposits. The solubility of substances is dependent on the temperature and the pH. Temperature and/or pH increases can likewise be the cause of undesirable precipitations and scale formations in cooling and boiler feed water systems, on heat transfer surfaces or in pipework.

Precipitations and deposits of calcium sulfate in water-carrying systems are worth avoiding in particular, since they are very difficult to remove again. The cost- and time-intensive use of potent complexing agents such as EDTA is generally indispensible, since standard methods such as mechanical cleaning or the use of an acid are not satisfactory in removing the deposits.

It is not just in cooling and boiler feed water systems where it is attempted to avoid the formation of calcium sulfate scale deposits and of other salt scale deposits. Seawater desalination by distillation and by membrane processes such as reverse osmosis or electrodialysis is another water-carrying system where it is desired to prevent the formation of these firm scale deposits.

It is known that low molecular weight polyacrylic acids produced by free-radical polymerization and their salts are used as scale inhibitors in industrial water treatment and in seawater desalination because of their dispersing and crystal growth inhibiting properties. The weight average molecular weight ($M_w$) of these polymers should be <50 000 for good performance. Polyacrylic acids with $M_w$<10 000 are often particularly effective. To produce low molecular weight polyacrylic acids, chain transfer agents are added as molecular weight regulators during the free-radical polymerization of acrylic acid. These regulators have to be adapted to the polymerization initiator and also to the polymerization process. Examples of initiators are organic and inorganic percompounds, such as peroxodisulfates (persulfates), peroxides, hydroperoxides and peresters, azo compounds such as 2,2'-azobisisobutyronitrile and redox systems with organic and inorganic components. The regulators used are frequently inorganic sulfur compounds such as hydrogensulfites, disulfites and dithionites, organic sulfides, sulfoxides, sulfones and mercapto compounds such as mercaptoethanol, mercaptoacetic acid and also inorganic phosphorus compounds such as hypophosphorous acid (phosphinic acid) and its salts (e.g., sodium hypophosphite).

EP-A 405 818 discloses a process for forming polymers from monoethylenically unsaturated monocarboxylic acids and optionally further monomers using sodium persulfate as initiator in the presence of hypophosphite as chain transfer agent, wherein an alkaline neutralizer is present during the polymerization in an amount sufficient to neutralize at least 20% of the acidic groups. The low molecular weight polymers obtained comprise at least 80% of the phosphorus from the hypophosphite. At least 70% of the phosphorus is said to end up within the polymer chain, as dialkyl phosphinate. The polymers thus obtained are used inter alia as laundry detergent additives, dispersants for clay slurries or scale inhibitors for water treatment.

In the exemplary embodiments, acrylic acid is polymerized in water in the presence of hypophosphite as chain transfer agent and sodium persulfate as initiator using the feed method wherein aqueous sodium hydroxide solution is added during the polymerization as a further continuous feed. This gives an aqueous polyacrylic acid having a weight average molecular weight $M_w$ of 2700 g/mol, which comprises 72% of the phosphorus in sodium hypophosphite as dialkyl phosphinate, 18% as monoalkyl phosphinate and 10% as inorganic salts. A comparative example dispenses with the aqueous sodium hydroxide feed and neutralizes with sodium hydroxide solution only after the polymerization has ended. The product obtained here is an aqueous polyacrylic acid having a weight average molecular weight $M_w$ of 4320 g/mol, which comprises just 45% of the phosphorus in sodium hypophosphite as dialkyl phosphinate, 25% as monoalkyl phosphinate and 30% as inorganic salts.

EP-A 0 510 831 discloses a process for forming polymers from monoethylenically unsaturated monocarboxylic acids, monoethylenically unsaturated dicarboxylic acids and optionally further monomers, comprising no carboxyl group, in the presence of hypophosphorous acid as chain transfer agent. At least 40% of the phosphorus incorporated in the polymer is present as monoalkyl phosphinate and monoalkyl phosphonate at the end of the polymer chain. The copolymers are used inter alia as dispersants, scale inhibitors and laundry detergent additives.

EP-A 0 618 240 discloses a process for polymerization of monomers in water in the presence of a water-soluble initiator and hypophosphorous acid or a salt thereof. The process is carried out such that the polymer content at the end of the polymerization is at least 50% by weight. This method provides an increased incorporation of the phosphorus in the polymer. The hypophosphite phosphorus is present in the polymer in the form of dialkyl phosphinate, monoalkyl phosphinate and also monoalkyl phosphonate. No information is provided as to the distribution of the phosphorus. The copolymers are used inter alia as dispersants, scale inhibitors and laundry detergent additives.

EP-A 1 074 293 discloses phosphonate-terminated polyacrylic acid having a molecular weight $M_w$ of 2000 to 5800 g/mol as a dispersant for producing aqueous slurries of calcium carbonate, kaolin, clay, talc and metal oxides having a solids content of at least 60% by weight.

The problem addressed by the present invention is that of providing low molecular weight polyacrylic acids having improved scale-inhibiting performance, which are effective in inhibiting precipitates and deposits of calcium sulfate in water-carrying systems in particular, and also a process for production thereof.

The problem is solved by aqueous solutions of acrylic acid polymers, obtainable by polymerization of acrylic acid in feed mode with peroxodisulfate as initiator in the presence of hypophosphite as chain transfer agent in water as solvent, wherein (i) water and optionally one or more ethylenically unsaturated comonomers are initially charged, and (ii) acrylic acid in acidic, unneutralized form, optionally one or more ethylenically unsaturated comonomers, an aqueous peroxodisulfate solution and an aqueous hypophosphite solution are added continuously, and (iii) a base is added on completion of the acrylic acid feed to the obtained solution, wherein the comonomer content does not exceed 30% by weight, based on the total monomer content.

The invention also provides a process for producing aqueous solutions by polymerization of acrylic acid in feed mode with peroxodisutfate as initiator in the presence of hypophosphite as chain transfer agent in water as solvent, wherein water and optionally one or more ethylenically unsaturated comonomers are initially charged, and acrylic acid in acidic, unneutralized form, optionally one or more ethylenically unsaturated comonomers, an aqueous peroxodisulfate solution and an aqueous hypophosphite solution are added continuously, and on completion of the acrylic acid feed, the solution obtained is at least partially neutralized by adding base, wherein the comonomer content does not exceed 30% by weight, based on the total monomer content.

In general, water is initially charged and heated to the reaction temperature of at least 75° C. and preferably in the range from 95 to 105° C. At temperatures below 75° C., the rate of decomposition of peroxodisulfate is generally no longer sufficient.

In addition, an aqueous solution of phosphorous acid can be included in the initial charge as a corrosion inhibitor.

This is followed by the commencement of the continuous feeds of acrylic acid, optionally of further monomer, initiator and chain transfer agent. Acrylic acid is added in unneutralized, acidic form. In general, the feeds are commenced simultaneously. Both peroxodisulfate as initiator and hypophosphite as chain transfer agent are added in the form of their aqueous solutions. Peroxodisulfate is generally used in the form of the sodium salt or ammonium salt. Hypophosphite can be used in the form of hypophosphorous acid (phosphinic acid) or in the form of salts of hypophosphorous acid. It is particularly preferable to use hypophosphite as hypophosphorous acid or as sodium salt.

The peroxodisulfate content of the aqueous peroxodisulfate solution is preferably in the range from 5% to 10% by weight. The hypophosphite content of the aqueous hypophosphite solution is preferably in the range from 35% to 70% by weight.

Preferably, peroxodisulfate is used in amounts of 0.5% to 10% by weight and preferably 0.8% to 5% by weight, based on the total amount of monomers (acrylic acid plus any comonomers).

Preferably, hypophosphite is used in amounts of 8% to 25% by weight and more preferably 8% to 15% by weight, based on the total amount of monomers.

The individual feeds are preferably added linearly, i.e., the feed quantity per unit time $\Delta m/\Delta t$ (=feed rate) is constant throughout the entire duration of the feed.

The duration of the initiator feed can be up to 50% longer than the duration of the acrylic acid feed. Preferably, the duration of the initiator feed is about 3 to 25% longer than the duration of the acrylic acid feed. The duration of the chain transfer agent feed may be up to 30% shorter than the duration of the acrylic acid feed. Preferably, the duration of the chain transfer agent feed is about 3 to 20% shorter than the duration of the acrylic acid feed.

The duration of the acrylic acid feed is in the range from 3 to 6 h for example. When all the feeds are commenced simultaneously, for example, the chain transfer agent feed will end from 10 to 20 min before the end of the acrylic acid feed and the initiator feed will end from 10 to 20 min after the end of the acrylic acid feed.

In general, on completion of the acrylic acid feed, the aqueous solution is at least partially neutralized by adding a base. Aqueous sodium hydroxide solution is preferably used as base. The neutralization is generally carried out over a comparatively long period ranging for example from ½ hour to 3 hours in order that the heat of neutralization may be efficiently removed. In general, sufficient base is added for the pH to be subsequently in the range from 3 to 9 and preferably in the range from 3.5 to 8.5.

In one version, the polymerization is carried out under an inert gas atmosphere. This provides acrylic acid polymers where the terminally bound phosphorus thereof is substantially (generally at least 90%) present in the form of phosphinate groups.

This provides aqueous solutions of acrylic acid polymers having a solids content of generally at least 30% by weight, preferably at least 35% by weight, more preferably in the range from 40% to 70% by weight and more particularly in the range from 40% to 55% by weight of polymer.

The acrylic acid polymers can also be converted into powder or granule form using suitable methods of drying such as spray drying, spray granulation, roll drying or paddle drying.

The aqueous solution of acrylic acid polymers which is thus obtainable generally has a total phosphorus content of organically and possibly inorganically bound phosphorus, wherein (a) a first portion of the phosphorus is present in the form of phosphinate groups bound within the polymer chain, (b) a second portion of the phosphorus is present in the form of phosphinate and/or phosphonate groups bound at the polymer chain end, (c) possibly a third portion of the phosphorus is present in the form of dissolved inorganic salts of phosphorus.

Generally at least 70% and preferably at least 76% of the total phosphorus content is present in the form of phosphinate groups bound within the polymer chain.

In many cases, even at least 78% of the total phosphorus content is present in the form of phosphinate groups bound within the polymer chain.

Generally at most 20% and preferably at most 16% of the phosphorus is present in the form of phosphinate and/or phosphonate groups bound at the polymer chain end. It is more preferable for 8 to 6% of the phosphorus to be present in the form of phosphinate and/or phosphonate groups bound at the polymer chain end.

Up to 20% of the phosphorus present in the aqueous solution of the acrylic acid polymers can be present in the form of inorganic phosphorus, more particularly in the form of hypophosphite and phosphite. Preferably from 2 to 15% and more preferably from 4 to 11% of total phosphorus is present in the form of inorganically bound phosphorus.

The ratio of phosphorus bound within the polymer chain to phosphorus bound at the chain end is at least 4:1. This ratio is preferably at least 4.5:1 to 10:1 and more particularly 5:1 to 8:1.

The weight average molecular weight of the acrylic acid polymer is generally in the range from 1000 to 5000 g/mol, preferably in the range from 1000 to 4000 g/mol, more preferably in the range from 1000 to 3000 g/mol and more particularly in the range from 1200 to 2500 g/mol.

The molecular weight of the acrylic acid polymer can be set in a specific manner via the amount of chain transfer agent used.

The molecular weight is determined via gel permeation chromatography on neutral aqueous solutions of the acrylic acid polymers using hydroxyethyl methacrylate copolymer network (HEMA) as stationary phase and polyacrylate standards.

The $M_w/M_n$ polydispersity index of the acrylic acid polymer is generally ≤2.5 and preferably ≤2.

The K-values of the polymers are between 10 and 25, preferably between 10 and 20 and more preferably between 12 and 18, as measured at pH 7 in 1% by weight aqueous solution at 25° C. after H. Fikentscher, Cellulose-Chemie volume 13, pages 58-64 and 71-74 (1932).

The acrylic acid polymer may comprise up to 30% by weight, preferably up to 20% by weight and more preferably up to 10% by weight, based on all ethylenically unsaturated monomers, of ethylenically unsaturated comonomers as polymerized units. Examples of suitable ethylenically unsaturated comonomers are methacrylic acid, maleic acid, maleic anhydride, vinylsulfonic acid, allylsulfonic acid and 2-acrylamido-2-methylpropane sulfonic acid and also salts thereof. Mixtures of these comonomers may also be present.

The comonomers can be wholly included in the initial reaction charge; partly initially charged and partly added as feed; or exclusively added as feed. When they are partly or wholly added as feed, they are generally added simultaneously with the acrylic acid.

Particular preference is given to acrylic acid homopolymers without comonomer content.

The invention also provides for the use of the aqueous solutions of the acrylic acid polymers as scale inhibitors in water-carrying systems.

The acrylic acid polymers of the invention serve to inhibit the formation of calcium sulfate scale deposits in particular.

Water-carrying systems in which the acrylic acid polymers can be used are more particularly seawater desalination plants, cooling water systems and boiler feed water systems.

The polymers of the present invention are generally added to the water-carrying systems in amounts from 0.1 mg/l to 100 mg/l. Optimum dosage depends on the requirement of the particular use and/or the operating conditions of the particular process. Thermal seawater desalination preferably utilizes the polymers in concentrations of 0.5 mg/l to 10 mg/l. Industrial cooling circuits or boiler feed water systems utilize polymer concentrations of up to 100 mg/l. Water analyses are frequently carried out to determine the proportion of scale-forming salts and hence optimum dosage.

The polymers of the present invention can also be added to the water-carrying systems in formulations which, in addition to the polymers of the present invention, may inter alia comprise, depending on the requirements, phosphonates, polyphosphates, zinc salts, molybdenum salts, organic corrosion inhibitors such as benzotriazole, tolyl-triazole, benzimidazole or ethynylcarbinol alkoxylates, biocides, complexing agents and/or surfactants. Examples of phosphonates are 1-hydroxyethane-1,1-diphosphonic acid (HEDP), 2-phosphonobutane-1,2,4-tricarboxylic acid (PBTC), aminotrimethylene-phosphonic acid (ATMP) diethylenetriaminepenta(methylenephosphonic acid) (DTPMP) and ethylenediaminetetra(methylenephosphonic acid) (EDTMP), which are each used in the form of their sodium salts.

The examples which follow illustrate the invention.

EXAMPLES

All molecular weights are determined using gel permeation chromatography (GPC). The GPC conditions used are as follows: 2 columns (Suprema Linear M) and a precolumn (Suprema Vorsäule), all of the brand Suprema-Gel (HEMA) from Polymer Standard Services (Mainz, Germany), were operated at 35° C. at a flow rate of 0.8 ml/min. The eluent used was an aqueous solution admixed with 0.15 M NaCl and 0.01 M $NaN_3$ and buffered with TRIS at pH 7. Calibration was done with an Na-PAA standard, the cumulative molecular weight distribution curve of which had been determined by SEC laser light dispersion coupling, using the calibration method of M. J. R. Cantow et al. (J. Polym. Sci., A-1, 5(1967) 1391-1394), albeit without the concentration correction proposed therein. The samples were all adjusted to pH 7, a portion of the solution was diluted with completely ion-free water to a solids content of 1.5 mg/mL and stirred for 12 hours. The samples were then filtered, and 100 μL was injected through a Sartorius Minisart RC 25 (0.2 μm) in each case.

Inventive Examples

Example A

A reactor was initially charged with 425.0 g of completely ion-free water followed by heating under nitrogen to 102° C. internal temperature. At this temperature, 481.0 g of a distilled acrylic acid, 206.0 g of a 7% by weight aqueous sodium peroxodisulfate solution and 246.0 g of a 59% by weight aqueous sodium hypophosphite solution were simultaneously added separately and concurrently under agitation. Acrylic acid was added within 4 hours, sodium peroxodisulfate within 4.25 hours and sodium hypophosphite within 3.75 hours. On completion of the acrylic acid feed the line was flushed with 30.0 g of completely ion-free water and 536.0 g of a 50% by weight aqueous sodium hydroxide solution were added at 100° C. internal temperature within one hour. Thereafter, polymer solution was cooled down to room temperature. The pH, the molecular weights $M_n$ and $M_w$, the solids content and the residual acrylic acid content were determined and the solution was visually assessed.

Example B

A reactor was initially charged with 425.0 g of completely ion-free water followed by heating under nitrogen to 102° C. internal temperature. At this temperature, 481.0 g of a distilled acrylic acid, 138.0 g of a 7% by weight aqueous sodium peroxodisulfate solution and 164.0 g of a 59% by weight aqueous sodium hypophosphite solution were simultaneously added separately and concurrently under agitation. Acrylic acid was added within 4 hours, sodium peroxodisulfate within 4.25 hours and sodium hypophosphite within 3.75 hours. On completion of the acrylic acid feed the line was flushed with 30.0 g of completely ion-free water and 525.0 g of a 50% by weight aqueous sodium hydroxide solution were added at 102° C. internal temperature within one hour. Thereafter, the polymer solution was cooled down to room temperature. The pH, the molecular weights $M_n$ and $M_w$ and the solids content were determined and the solution was visually assessed.

Example C

A closed reactor was initially charged with 425 g of completely ion-free water. The water was then heated under nitrogen to 98° C. internal temperature. At this temperature, 481 g of a distilled acrylic acid, 69 g of a 7% by weight aqueous sodium peroxodisulfate solution and 82 g of a 59% by weight aqueous sodium hypophosphite solution were simultaneously added separately and concurrently under agitation. Acrylic acid was added within 4 hours, sodium peroxodisulfate within 4.25 hours and sodium hypophosphite within 3.75 hours. On completion of the acrylic acid feed, the acrylic acid line was flushed with 30 g of completely ion-free water and then 55 g of a 50% by weight aqueous sodium hydroxide solution were added at 98° C. internal temperature within 1 hour. This was followed by the addition of a further 225 g of completely ion-free water and the polymer solution was cooled down to room temperature. The pH, the molecular weights $M_n$ and $M_w$ and the solids content were determined and the solution was visually assessed.

Example D

A reactor was initially charged with 50 g of polymer from example 9. At room temperature, 17.5 g of 50% by weight aqueous sodium hydroxide solution were added at 98° C. internal temperature within 1 hour. The pH, the molecular weights $M_n$ and $M_w$ and the solids content were determined and the solution was visually assessed.

Example E

A reactor was initially charged with 230.0 g of completely ion-free water followed by heating under nitrogen to 102° C. internal temperature. At this temperature, 480.8 g of a distilled acrylic acid, 69.0 g of a 7% by weight aqueous sodium peroxodisulfate solution and 57.0 g of a 59% by weight aqueous sodium hypophosphite solution were simultaneously added separately and concurrently under agitation. Acrylic acid was added within 5 hours, sodium peroxodisulfate with 5.25 hours and sodium hypophosphite within 4.75 hours. On completion of the acrylic acid feed the line was flushed with 30.0 g of completely ion-free water and the batch was stirred at 95° C. internal temperature for 2 hours. Then, 175.0 g of completely ion-free water were added and in the process the polymer solution cooled down to room temperature. The polymer solution was then adjusted with 50% by weight aqueous sodium hydroxide solution to pH 7. The pH, the molecular weights $M_n$ and $M_w$ and the solids content were determined and the solution was visually assessed.

Example F

A reactor was initially charged with 425.0 g of completely ion-free water followed by heating under nitrogen to 100° C. internal temperature. At this temperature, 481.0 g of a distilled acrylic acid, 69.0 g of a 7% by weight aqueous sodium peroxodisulfate solution and 41.0 g of a 59% by weight aqueous sodium hypophosphite solution were simultaneously added separately and concurrently under agitation. Acrylic acid was added within 4 hours, sodium peroxodisulfate with 4.25 hours and sodium hypophosphite within 3.75 hours. On completion of the acrylic acid feed the line was flushed with 30.0 g of completely ion-free water and 527.0 g of a 50% by weight aqueous sodium hydroxide solution were added at 100° C. internal temperature within 1 hour. Thereafter, the polymer solution was cooled down to room temperature. The pH, the molecular weights $M_n$ and $M_w$, the solids content and the residual acrylic acid content were determined and the solution was visually assessed.

Example G

A reactor was initially charged with 325.0 g of completely ion-free water followed by heating under nitrogen to 95° C. internal temperature. At this temperature, 562.5 g of a distilled acrylic acid, 542.4 of a 49% by weight aqueous 2-acrylamido-2-methylpropanesulfonic acid sodium salt (Na-AMPS) solution stabilized with 250 ppm of MEHQ, 533.0 g of a 7% by weight aqueous sodium peroxodisulfate solution and 127.1 g of a 59% by weight aqueous sodium hypophosphite solution were simultaneously added separately and concurrently under agitation. Acrylic acid and Na-AMPS were added within 3 hours, sodium peroxodisulfate with 4.5 hours and sodium hypophosphite within 2.75 hours. On completion of the acrylic acid feed 175.0 g of a 50% by weight aqueous sodium hydroxide solution were added at 95° C. internal temperature within 2 hours. Thereafter, the polymer solution was cooled down to room temperature. The pH, the molecular weights $M_n$ and $M_w$, the solids content and the residual acrylic acid content were determined and the solution was visually assessed.

Comparative Examples

Example H

A reactor was initially charged with 200.0 g of completely ion-free water together with 2.7 g of a 50% by weight aqueous solution of phosphorous acid followed by heating under nitrogen to 101° C. internal temperature. At this temperature, 428.0 g of a distilled acrylic acid, 123.0 g of a 7% by weight aqueous sodium peroxodisulfate solution and 108.0 g of 2-mercaptoethanol were simultaneously added separately and concurrently under agitation. Acrylic acid was added within 5 hours, sodium peroxodisulfate within 5.25 hours and 2-mercaptoethanol within 4.75 hours. On completion of the sodium peroxodisulfate feed stirring was continued at 101° C. internal temperature for a further 15 minutes followed by cooling to 80° C. internal temperature. At 80° C. internal temperature, 16.2 g of a 5.38% by weight aqueous solution of an azo initiator (Wako V50) were added within 30 minutes followed by stirring for 1 hour. Then, 475.0 g of 50% by weight aqueous sodium hydroxide solution were added at 80-95° C. internal temperature in 1 hour followed by stirring for 10 min. Then, 14.0 g of a 50% by weight aqueous hydrogen peroxide solution were added in 30 minutes followed by polymerization at 80° C. for 4 hours. Thereafter, the polymer solution was cooled down to room temperature. The pH, the molecular weights $M_n$ and $M_w$ and the solids content were determined and the solution was visually assessed.

Example I

A reactor was initially charged with 230.0 g of completely ion-free water together with 3.05 g of a 50% by weight aqueous solution of phosphorous acid solution followed by heating under nitrogen to 99° C. internal temperature. At this temperature, 479.35 g of a distilled acrylic acid, 68.65 g of a 7% by weight aqueous sodium peroxodisulfate solution and 59.9 g of 2-mercaptoethanol were simultaneously added separately and concurrently under agitation. Acrylic acid was added within 5 hours, sodium peroxodisulfate within 5.25 hours and 2-mercaptoethanol within 4.75 hours. On completion of the acrylic acid feed the line was flushed with 12.5 g of completely ion-free water and on completion of the sodium peroxodisulfate feed stirring was continued at 105° C. internal temperature for a further 15 minutes followed by cooling to 80° C. internal temperature. At 80° C. internal temperature, 5.0 g of a 6% by weight aqueous Wako V50 solution were added within 1 hour. On completion of the addition the line was flushed with 5.0 g of completely ion-free water followed by stirring at 80° C. for 1 hour. Then, 521.5 g of 50% by weight aqueous sodium hydroxide solution were added at most 105° C. internal temperature in 1 hour. This was followed by stirring for 10 minutes, then, 26.25 g of a 50% by weight aqueous hydrogen peroxide solution were added within 1.3 hours followed by polymerization at 80° C. for 15 minutes. Thereafter, 140.0 g of completely ion-free water were added and in the process the polymer solution was cooled down to room temperature. The pH, the molecular weights $M_n$ and $M_w$ and the solids content were determined and the solution was visually assessed.

Example J

A reactor was initially charged with 230.0 g of completely ion-free water together with 3 kg of a 50% by weight aqueous solution of phosphorous acid followed by heating under nitrogen to 99° C. internal temperature. At this temperature, 516.9 g of a distilled acrylic acid, 67.4 g of a 7% by weight aqueous sodium peroxodisulfate solution and 44 g of 2-mercaptoethanol were simultaneously added separately and concurrently under agitation. Acrylic acid was added within 4 hours, sodium peroxodisulfate within 4 hours and 2-mercaptoethanol within 3.75 hours. On completion of the acrylic acid feed the acrylic acid line was flushed with 12.5 g of completely ion-free water and a further 20 g of a 7% by weight aqueous sodium peroxodisulfate solution were added within 30 minutes. This was followed by stirring at 99° C. internal temperature for 30 minutes and cooling down to 80° C. internal temperature. At 80° C. internal temperature, 10 g of a 6% by weight aqueous Wako V50 solution were added within 1 hour, the line was flushed with 5 g of completely ion-free water and stirring was continued for 1 hour. Then, 560 g of a 50% by weight aqueous sodium hydroxide solution were added at 95° C. internal temperature in 1 hour followed by stirring for 10 minutes. Then, 20 g of a 50% by weight aqueous hydrogen peroxide solution were added within 1 hour followed by polymerization at 80° C. for 15 minutes. Thereafter, 100 g of completely ion-free water were added and the polymer solution was cooled down to room temperature. The pH, the molecular weights $M_n$ and $M_w$, the solids content and the residual acrylic acid content were determined and the solution was visually assessed.

Example K

Example 1 was repeated except that 50 g of a 56% by weight solution of 2-mercaptoethanol and only 62 g of a 7% by weight aqueous solution of sodium peroxodisulfate were added.

Example L

A 2 L reactor was initially charged with 230 g of completely ion-free water together with 3.1 g of a 50% by weight aqueous solution of phosphorous acid. This was followed by heating under nitrogen to 99° C. internal temperature. At this temperature, 520 g of a distilled acrylic acid, 74 g of a 7% by weight aqueous sodium peroxodisulfate solution and 23.4 g of 2-mercaptoethanol were simultaneously added separately and concurrently under agitation. Acrylic acid was added within 4 hours, sodium peroxodisulfate within 4 hours and 2-mercaptoethanol within 3.75 hours. On completion of the acrylic acid feed 500 g of a 50% by weight aqueous sodium hydroxide solution were added within 15 minutes. This was followed by stirring at 99° C. for 15 minutes and then cooling down to 80° C. internal temperature. At 80° C. internal temperature, 10.1 g of a 6% by weight aqueous Wako V50 solution were added within 1 hour followed by 1 hour of stirring. Then, 525 g of a 50% by weight aqueous sodium hydroxide solution were added within 2.8 hours at 95° C. internal temperature followed by stirring for 1 hour. Then 10.75 g of a 50% by weight aqueous hydrogen peroxide solution were added in 0.5 hours followed by polymerization at 80° C. for 15 minutes. Thereafter, 125 g of completely ion-free water were added and in the process the polymer solution was cooled down to room temperature. The pH, the molecular weights $M_n$ and $M_w$, the solids content and the residual acrylic acid content were determined and the solution was visually assessed.

Example M

A closed reactor was initially charged with 4525 kg of completely ion-free water. This was followed by heating under nitrogen to 95° C. internal temperature. At this temperature, 11 096 kg of a distilled acrylic acid, 4756 kg of a 7% by weight aqueous sodium peroxodisulfate solution and 4993 kg of a 40% by weight aqueous sodium bisulfite solution were simultaneously added separately and concurrently under agitation. Acrylic acid was added within 5.5 hours, sodium peroxodisulfate within 5.75 hours and sodium bisulfite within 5.5 hours. On completion of the acrylic acid feed the line was flushed with 50 kg of completely ion-free water. This was followed by stirring at 95° C. for 15 minutes and then cooling down to 80° C. internal temperature. At this temperature, 189 kg of a 6% by weight aqueous Wako V50 solution were added within 1 hour. Thereafter, 12 505 kg of a 50% by weight aqueous sodium hydroxide solution were added while the internal temperature did not exceed 85° C. Thereafter, the polymer solution was cooled down to room temperature. The pH, the molecular weights $M_n$ and $M_w$ and the solids content were determined and the solution was visually assessed.

Example N

A reactor was initially charged with 304.0 g of completely ion-free water together with 1.84 g of a 50% by weight aqueous solution of phosphorous acid followed by heating under nitrogen to 98° C. internal temperature. At this temperature, 461.0 g of a distilled acrylic acid, 132.0 g of a 7% by weight aqueous sodium peroxodisulfate solution and 196.0 g of a 40% by weight aqueous sodium bisulfite solution were simultaneously added separately and concurrently under agitation. Acrylic acid was added within 4 hours, sodium peroxodisulfate within 4.25 hours and sodium bisulfite within 3.75 hours. On completion of the acrylic acid feed 496.0 g of a 50% by weight aqueous sodium hydroxide solution were added within 1 hour at 98° C. internal temperature followed by polymerization at 98° C. for 1 hour. Thereafter, the polymer solution was cooled down to room temperature. The pH, the molecular weights $M_n$ and $M_w$, the solids content and the residual acrylic acid content were determined and the solution was visually assessed.

Example O

A reactor was initially charged with 184.0 g of completely ion-free water. This was followed by heating under nitrogen to 95° C. internal temperature. At this temperature, 647.7 g of a distilled acrylic acid, 277.6 g of a 7% by weight aqueous sodium peroxodisulfate solution and 105.3 g of a 40% by weight aqueous sodium bisulfite solution were simultaneously added separately and concurrently under agitation. The acrylic acid was added within 5 hours, sodium peroxodisulfate within 5.25 hours and sodium bisulfite within 5 hours. On completion of the acrylic acid feed the line was flushed with 10.0 g of completely ion-free water for 6 minutes followed by stirring at 95° C. internal temperature for a further 35 minutes. Thereafter, 728.0 g of a 50% by weight aqueous sodium hydroxide solution were added, while the internal temperature did not exceed 95° C., followed by polymerization at 95° C. for 30 minutes. Then, 136.0 g of completely ion-free water were added and in the process the polymer solution cooled down to room temperature. After the internal temperature had dropped to <75° C., 5.8 g of a 49% by weight aqueous hydrogen peroxide solution were added. The pH, the molecular weights $M_n$ and $M_w$ and the solids content were determined and the solution was visually assessed.

The analytical data of the polymers are summarized in table 1.

TABLE 1

| Example | Solids content [%][a] | K value[b] | pH (tq) | Mw[c] | PDI[c] | %-P internal[d] | %-P external[d] | %-P inorg[d] |
|---|---|---|---|---|---|---|---|---|
| A | 40.2 | 12.6 | 6.9 | 1270 | 1.2 | 81.2 | 13.5 | 5.3 |
| B | 42.2 | 14.6 | 7.0 | 2000 | 1.4 | 76.3 | 15.0 | 8.7 |
| C | 36.4 | 20.1 | 4.5 | 3620 | 1.7 | 81.4 | 11.4 | 7.2 |
| D | 39.0 | 20.1 | 7.0 | 3620 | 1.7 | 81.4 | 11.4 | 7.2 |
| E | 45.2 | 25.0 | 7.0 | 5560 | 2.1 | 84.7 | 12.1 | 2.6 |
| F | 42.3 | 29.1 | 7.0 | 7180 | 2.4 | 72.1 | 16.1 | 5.6 |
| G | 42.3 | 17.9 | 4.3 | 2870 | 2.0 | 89.5 | 8.2 | 2.2 |
| H | 49.7 | 12.6 | 7.6 | 1070 | 1.3 | — | — | — |
| I | 44.9 | 18.4 | 7.0 | 1860 | 1.8 | — | — | — |
| J | 46.7 | 22.0 | 7.2 | 3580 | 2.1 | — | — | — |
| K | 49.0 | 24.1 | 7.0 | 5020 | 1.7 | — | — | — |
| L | 45.2 | 29.5 | 7.2 | 7220 | 2.8 | — | — | — |
| M | 40.6 | 14.5 | 6.9 | 2470 | 1.5 | — | — | — |
| N | 43.5 | 20.3 | 6.9 | 4450 | 1.8 | — | — | — |
| O | 44.7 | 30.6 | 6.9 | 9560 | 3.1 | — | — | — |

[a]ISO 3251, (0.25 g, 150° C., 2 h)
[b]determined by Fikentscher method with 1% solution in completely ion-free water
[c]determined by gel permeation chromatography
[d]determined with $^{31}P\{^{1}H\}$ and $^{31}P$ NMR Use as Scale Inhibitor Calcium Sulfate Inhibition Test A solution of NaCl, Na$_2$SO$_4$, CaCl$_2$ and polymer was shaken for 24 h at 70° C. in a water bath. After the still warm solution has been filtered through a 0.45 μm Milex filter, the Ca content of the filtrate is determined complexometrically or by means of a Ca$^{2+}$-selective electrode and the CaSO$_4$ inhibition determined in % by before/after comparison (see formula I).

| Conditions | |
|---|---|
| Ca$^{2+}$ | 2940 mg/l |
| SO$_4^{2-}$ | 7200 mg/l |
| Na$^+$ | 6400 mg/l |
| Cl$^-$ | 9700 mg/l |
| Polymer | 5 mg/l (100%) |
| Temperature | 70° C. |
| Time | 24 hours |
| pH | 8.0-8.5 |

CaSO$_4$ inhibition (%)=mg (Ca$^{2+}$) after 24 h–mg (Ca$^{2+}$) blank value after 24 h/mg (Ca$^{2+}$) null value–mg (Ca$^{2+}$) blank value 24 h×100    Formula I:

TABLE 2

| (Example) | Initiator/regulator | K value (1% in water) | Mw (GPC) | Inhibition [%] |
|---|---|---|---|---|
| A | NPS/NHP | 12.6 | 1270 | 79.2 |
| B | NPS/NHP | 14.6 | 2000 | 84.4 |
| D | NPS/NHP | 20.1 | 3620 | 43.6 |
| E | NPS/NHP | 25.0 | 5560 | 14.5 |
| F | NPS/NHP | 29.1 | 7180 | 12.1 |
| G | NPS/NHP | 17.9 | 2870 | 66.9 |
| H | NPS/MCE/Azo | 12.6 | 1070 | 22.6 |
| I | NPS/MCE/Azo | 18.4 | 1860 | 32.6 |
| J | NPS/MCE/Azo | 22.0 | 3580 | 19.3 |
| K | NPS/MCE/Azo | 24.1 | 5020 | 15.3 |
| L | NPS/MCE/Azo | 29.5 | 7220 | 12.6 |
| M | NPS/NBS | 14.5 | 2470 | 25.5 |
| N | NPS/NBS | 20.3 | 4450 | 19.9 |
| O | NPS/NBS | 30.6 | 9560 | 9.1 |

NPS = sodium peroxodisulfate
NHP = sodium hypophosphite
MCE = mercaptoethanol
NBS = sodium bisulfite
Azo = 2,2'-azobis(2-amidinopropane) dihydrochloride for secondary polymerization The results are an unequivocal demonstration of the superiority of the inventive polymers as per examples A, B and D over the comparative polymers as per examples H,I, J,M, N. According to examples A, B and D, the preferred molecular weights Mw are <4000 and more particularly <2500.

The invention claimed is:

1. An aqueous solution of an acrylic acid polymer, obtained by polymerization of acrylic acid in feed mode with peroxodisulfate as initiator in the presence of hypophosphite in water as solvent,
   wherein:
   (i) water and optionally one or more ethylenically unsaturated comonomers are initially charged; and
   (ii) acrylic acid in acidic, unneutralized form, optionally one or more ethylenically unsaturated comonomers, aqueous peroxodisulfate solution and aqueous hypophosphite solution are added continuously; and (iii) a base is added on completion of the acrylic acid feed to the aqueous solution, and wherein:

the comonomer content does not exceed 30% by weight, based on total monomer content;

said acrylic acid polymer has a weight average molecular weight ranging from 1000 to 2500 g/mol; and at most 8% of phosphorous contained in said acrylic acid polymer is present in the form of phosphinate and/or phosphonate groups bound at a polymer chain end.

2. The aqueous solution according to claim 1, wherein the weight average molecular weight of the acrylic acid polymer ranges from 1200 to 2500 g/mol.

3. The aqueous solution according to claim 1, wherein the $M_w/M_n$ polydispersity index of the acrylic polymer is <2.5.

4. The aqueous solution according to claim 1 having a total phosphorus content of organically and possibly inorganically bound phosphorus, wherein
   (a) a first portion of the phosphorus is present in the form of phosphinate groups bound within the polymer chain,
   (b) a second portion of the phosphorus is present in the form of phosphinate and/or phosphonate groups bound at the polymer chain end,
   (c) possibly a third portion of the phosphorus is present in the form of dissolved inorganic salts of phosphorus,
   wherein at least 70% of the total phosphorus content is present in the form of phosphinate groups bound within the polymer chain of the acrylic acid polymer.

5. The aqueous solution according to claim 1, wherein the acrylic acid polymer is an acrylic acid homopolymer.

6. The aqueous solution according to claim 1, wherein the acrylic acid polymer is an acrylic acid copolymer comprising up to 30% by weight, based on all ethylenically unsaturated monomers, of one or more ethylenically unsaturated comonomers selected from the group consisting of methacrylic acid, maleic acid, maleic anhydride, vinylsulfonic acid, allylsulfonic acid and 2-acrylamido-2-methylpropane-sulfonic acid, as polymerized units.

7. An acrylic acid polymer obtained from the aqueous solution according to claim 1.

8. The aqueous solution according to claim 1, wherein said process consists of:
   (i) water and optionally one or more ethylenically unsaturated comonomers are initially charged; and
   (ii) acrylic acid in acidic, unneutralized form, optionally one or more ethylenically unsaturated comonomers, aqueous peroxodisulfate solution and aqueous hypophosphite solution are added continuously; and
   (iii) a base is added on completion of the acrylic acid feed to the aqueous solution.

9. The aqueous solution according to claim 1, wherein 6-8% of phosphorous contained in said acrylic acid polymer is present in the form of phosphinate and/or phosphonate groups bound at a polymer chain end.

* * * * *